United States Patent
Ientile et al.

(10) Patent No.: US 9,086,944 B2
(45) Date of Patent: Jul. 21, 2015

(54) METHOD AND SYSTEM FOR SYNCHRONIZING CHANGES BETWEEN PRODUCT DEVELOPMENT CODE AND RELATED DOCUMENTATION

(75) Inventors: Louisa Ientile, Rome (IT); Giulia Farinelli, Rome (IT); Cristina Bonanni, Rome (IT); Ivana Benefazio, Rome (IT); Paola Carlesimo, Rome (IT); Maria Rita Celestini, Rome (IT); Gabriella Santoro, Rome (IT)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 13/500,068

(22) PCT Filed: Aug. 24, 2010

(86) PCT No.: PCT/EP2010/062323
§ 371 (c)(1),
(2), (4) Date: Apr. 3, 2012

(87) PCT Pub. No.: WO2011/042249
PCT Pub. Date: Apr. 14, 2011

(65) Prior Publication Data
US 2012/0204151 A1 Aug. 9, 2012

(30) Foreign Application Priority Data
Oct. 8, 2009 (EP) .................................... 09172528

(51) Int. Cl.
*G06F 9/44* (2006.01)
(52) U.S. Cl.
CPC ........................................ *G06F 8/71* (2013.01)
(58) Field of Classification Search
CPC ..................................... G06F 8/71; G06F 8/73
See application file for complete search history.

(56) References Cited

U.S. PATENT DOCUMENTS 5,860,007 A * 1/1999 Soni et al. .................... 717/121
5,893,913 A 4/1999 Brodsky et al.
(Continued)

FOREIGN PATENT DOCUMENTS

WO WO97/12320 4/1997

OTHER PUBLICATIONS

Audris Mockus, Roy T. Fielding, and James D. Herbsleb; Two case studies of open source software development: Apache and Mozilla, [Online] 2002, ACM Trans. Softw. Eng. Methodol. 11, 3 (Jul. 2002), [Retrieved from the Internet] <http://doi.acm.org/10.1145/567793.567795> pp. 309-346.*

(Continued)

*Primary Examiner* — Thuy Dao
*Assistant Examiner* — Ravi K Sinha
(74) *Attorney, Agent, or Firm* — Steven M. Greenberg, Esq.; CRGO Law

(57) ABSTRACT

A method and system for synchronizing source code files and related documentation during software development of a software product including a plurality of files, each file being assigned to a owner, including the steps of: an Event Manager module detecting a change made by a programmer in a file of the plurality of files and saving the status of the file before the change; an Event Handler module identifying the owner of the file containing the detected change; the Event Handler module notifying the owner of the detected change; prompting the owner in approving or rejecting the change; responsive to the owner input, synchronizing the plurality of files or deleting the detected change rolling back to the saved status.

13 Claims, 4 Drawing Sheets

(56) References Cited

U.S. PATENT DOCUMENTS

| | | | |
|---|---|---|---|
| 6,698,013 B1* | 2/2004 | Bertero et al. | 717/127 |
| 7,457,817 B2* | 11/2008 | Krishnaswamy et al. | 707/999.001 |
| 7,870,066 B2* | 1/2011 | Lin et al. | 705/39 |
| 7,975,031 B2* | 7/2011 | Bhattacharya et al. | 709/221 |
| 8,584,079 B2* | 11/2013 | Yassin et al. | 717/101 |
| 2001/0049704 A1* | 12/2001 | Hamburg et al. | 707/530 |
| 2003/0172367 A1* | 9/2003 | Kannenberg | 717/101 |
| 2004/0068713 A1* | 4/2004 | Yannakoyorgos et al. | 717/101 |
| 2006/0015863 A1* | 1/2006 | Vaidyanathan et al. | 717/170 |
| 2010/0169865 A1* | 7/2010 | Clemm | 717/121 |
| 2010/0313179 A1* | 12/2010 | Groves et al. | 717/101 |
| 2011/0125798 A1* | 5/2011 | Misch et al. | 707/785 |
| 2011/0179280 A1* | 7/2011 | Imrey et al. | 713/178 |
| 2012/0089960 A1* | 4/2012 | Medvidovic et al. | 717/105 |

OTHER PUBLICATIONS

Briand, L.C.; Basili, V.R.; Yong-Mi Kim; Squier, D.R., A change analysis process to characterize software maintenance projects, [Online] 1994, Software Maintenance, International Conference on, Sep. 19-23, 1994, [Retrieved from the Internet] <http://ieeexplore.ieee.org/stamp/stamp.jsp?tp=&arnumber=336791&isnumber=7911> pp. 38-49.*

Di Penta, M.; German, D.M., Who are Source Code Contributors and How do they Change?, [Online] 2009, Reverse Engineering, WCRE '09. 16th Working Conference on, Oct. 13-16, 2009, [Retrieved from the Internet] <http://ieeexplore.ieee.org/stamp/stamp.jsp?tp=&arnumber=5328628&isnumber=5328619> pp. 11-20.*

* cited by examiner

METHOD AND SYSTEM FOR SYNCHRONIZING CHANGES BETWEEN PRODUCT DEVELOPMENT CODE AND RELATED DOCUMENTATION

CROSS-REFERENCE TO RELATED APPLICATIONS

This application is a §371 national stage entry of International Application No. PCT/EP2010/062323, filed Aug. 24, 2010, which claims priority to European Patent Application No. 09172528.3, filed Oct. 8, 2009, the entirety of which is incorporated herein by reference.

TECHNICAL FIELD

The present invention relates to the field of data processing and more particularly to a method and system for synchronizing source files and related documentation during the development of software code.

BACKGROUND OF THE INVENTION

Currently, to synchronize changes to source files owned by the code development team with all source files owned by the documentation development team, and vice versa, the teams normally rely on e-mails and human communication. This causes misalignments between the code source files and the documentation source files because often the owner of the change might forget to communicate it to the other teams involved or does not realize that the change could impact files owned by other teams. US 2005/0060688 A1 "Automated source code software programmer's manual generator" discloses a method for generating a software documentation file from a software source code file. According to this method the automatic program documentation generation tool reads the source code file for the software and it automatically extracts software documentation from the source code file, by for example, locating documentation begin and end indicia within the source code. A prerequisite of this tool is that proper documentation information is already contained in the source code, e.g. previously written by a software developer, programmer, or engineer. The tool then creates a software documentation file, such as, for example, a UNIX Man Page or an HTML page, from software documentation extracted from the source code. The tool according to this document is useful for generating documentation under certain conditions, but it is of little help for maintaining such documentation and for ensuring that the documentation is consistent with amended code, in particular when several parties (e.g. software developers, system engineers, tester) are involved.

It is an object of the present invention to provide a technique which alleviates the above drawbacks of the prior art.

SUMMARY OF THE INVENTION

According to the invention, there is provided, during software development and maintenance of a software product, method for managing changes to a plurality of software code files and a plurality of their related documentation files, each file being associated with at least one file owner, including the steps of:
reading in a repository a list of key terms occurring in said files;
detecting an on line change occurring to one of the listed terms in one of the files;
identifying all occurrences, across all the files, of the term for which a change has been detected; and identifying at least one said file owner associated with each file in which a term occurrence has been found;
prompting each at least one identified file owner for approving or rejecting the change on the identified occurrences;
responsive to the approval by each at least one identified file owner, implementing the detected change to all identified occurrences across all the identified files.

A method according to claim 1 is also provided, said method further comprising:
after the detecting step, saving the status of the file before the detected change, for possible later reuse;
recovering to saved status of the file where the change has been detected, in case not all at least one identified file owner approve the change.

A method according to any preceding claim is also provided wherein the lack of approval by one or more of the at least one file owner within a predetermined period of time it is considered as equivalent to the change being rejected.

A method according to any preceding claim is also provided wherein the lack of approval by one or more of the at least one file owner within a predetermined period of time it is considered as equivalent to the change being approved.

A method according to any preceding claim is also provided wherein the repository contains two separate lists of terms, a first list containing terms which can be found on software code files and a second list containing terms which can be found on documentation files.

The proposed method can help to solve the problem of synchronizing code and documentation by providing a method which automatically manages changes on common terms and report them from the source files owned by the code development team to the source files usually owned by the documentation development team and/or vice versa. The method creates an association or a link between one or more code source files and one or more source documentation files (e.g. screenshots, graphics, online documentation, books) and vice versa. In a preferred embodiment of the present invention, each time a source file is changed that impacts a documentation source file, the owner of the associated documentation files is notified of the change, and is offered the opportunity of approving or rejecting the proposed change. In this way, impact to documentation cannot be overlooked by developers and changes can be automatically implemented. Also, if the links are correctly established, all impacted documentation deliverables are updated.

In a further embodiment of the present invention it is provided a system comprising one or more components adapted to perform the method above.

In another embodiment a computer program is provided which implements the steps of the method described above when the program is executed on a computer.

BRIEF DESCRIPTION OF THE DRAWINGS

Embodiments of the invention will now be described, by way of example only, by reference to the accompanying drawings, in which.

DESCRIPTION OF A PREFERRED EMBODIMENT

Figure 1:
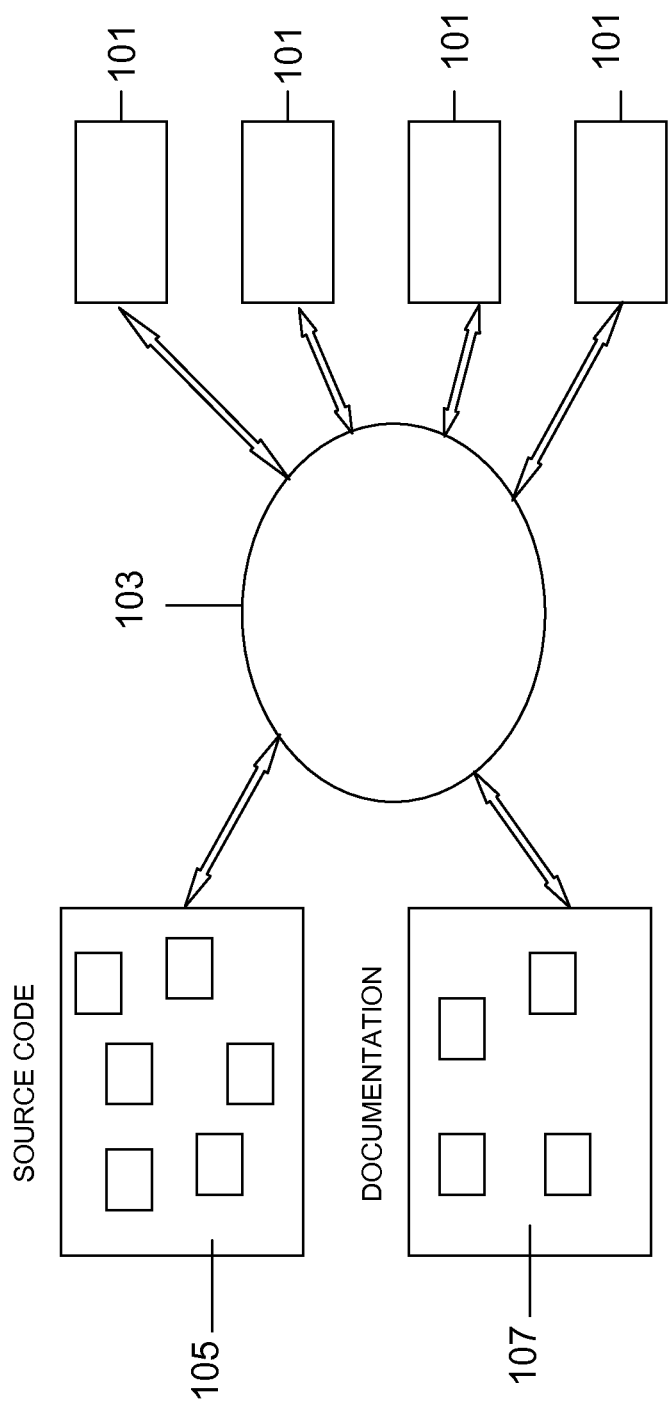
FIG. 1 is a schematic diagram of a network system implementing a preferred embodiment of the present invention.

FIG. 1 shows a schematic representation of a network system suitable for implementing the present invention. Several users are connected through computers 101 and a network (e.g. the Internet) 103 to a plurality of source code files 105 and to a plurality of documentation files 107. There is a need of maintaining the documentation files consistent with the source code files; in particular the terms used in the documentation must match with the terms used in the source code files. When a software developer wants to modify one of the terms (e.g. variable, constants, name of procedures), this change must be reflected first of all throughout the source code files (otherwise the software would not correctly work) but also in the related documentation. According to a preferred embodiment of the present invention, also the opposite flow is possible: if someone, with the right authorisation level, makes a change to a term used in the documentation, such change could be reflected to the corresponding term in the source code, provided the necessary approvals are obtained.

Figure 2:
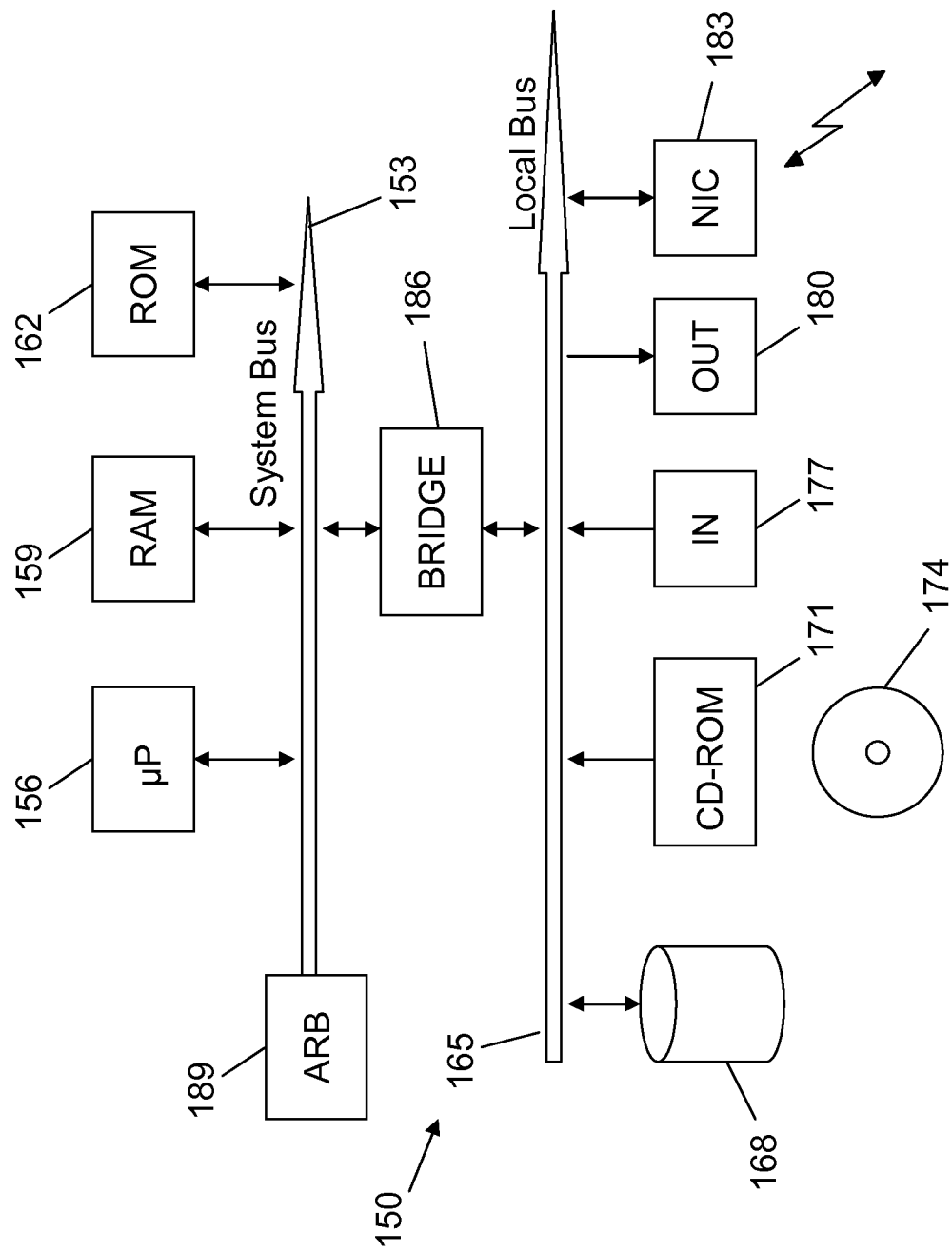
FIG. 2 is a block diagram of a generic computer system adapted to perform the method of a preferred embodiment of the present invention.

As shown in FIG. 2, a generic computer of the system (e.g. computer, Internet server, router, remote servers) is denoted with 150. The computer 150 is formed by several units that are connected in parallel to a system bus 153. In detail, one or more microprocessors 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). A Network Interface Card 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153. Similar considerations apply if the system has a different topology, or it is based on other networks. Alternatively, the computers have a different structure, include equivalent units, or consist of other data processing entities (such as PDAs, mobile phones, and the like).

Figure 3:
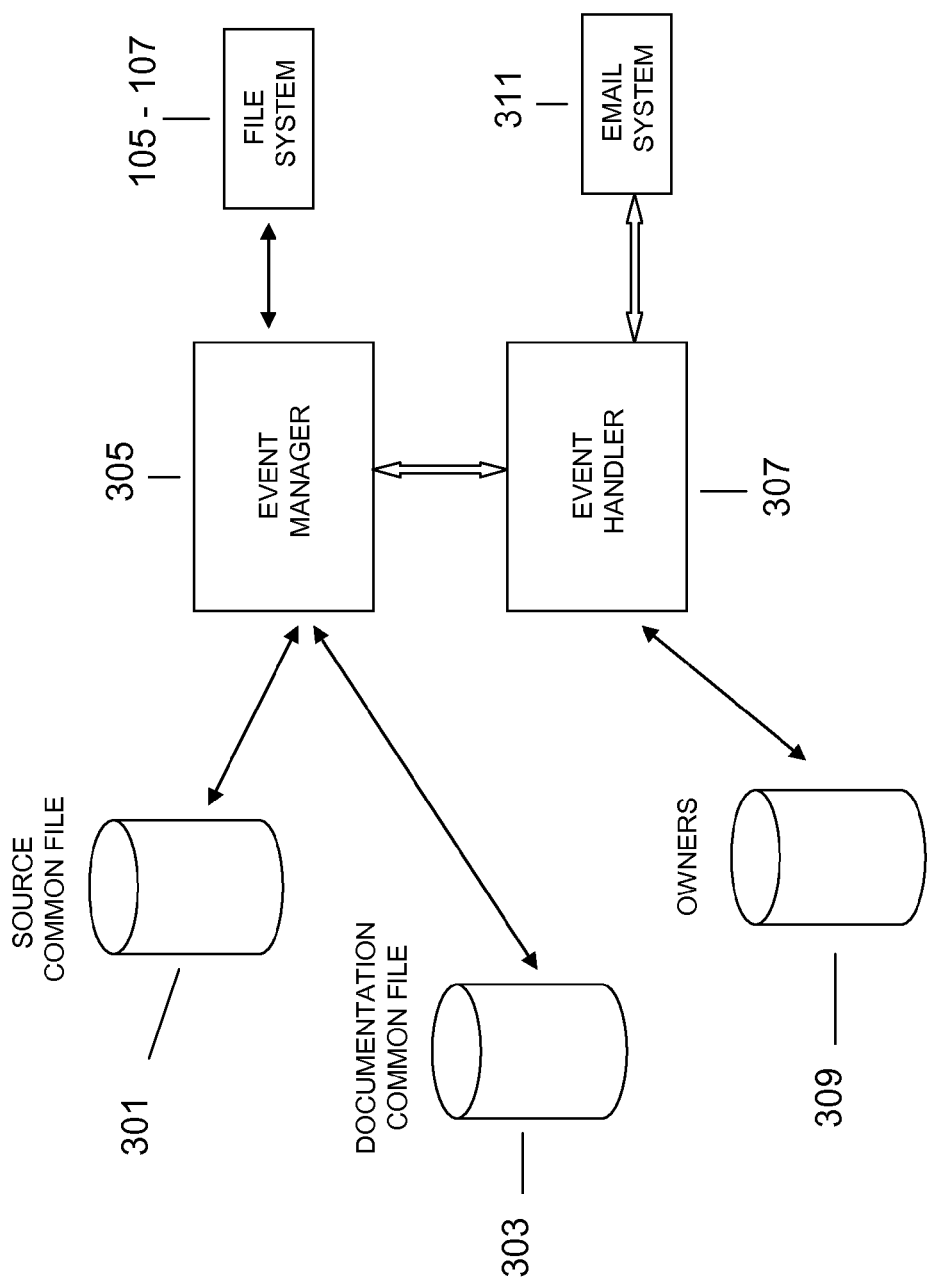
FIG. 3 shows a schematic representation of a preferred embodiment of the present invention.

FIG. 3 is a schematic representation of a system implementing a preferred embodiment of the present invention. Commonly used terms (e.g. graphical user interface labels or strings) are identified through unique IDs. These terms are defined in two Common files 301 and 303; one file is owned by the Documentation team, while the other is owned by the Development team. The 2 Common files share many terms (identified by ID keys). These terms are referenced through their IDs in both the documentation (manuals, screens, graphics, etc. . . . ) and development files (resource files, etc. . . . ). Those skilled in the art will appreciate that the two lists could be even contained in one single file, while in the preferred embodiment here described they are two separate files.

Every time a developer or a writer accesses a file and makes a change to a term, if such term is included in the Common Files, an Event Manager module 305 detects the proposed change.

In a preferred embodiment of the present invention the Event Manager module 305 identifies all the files impacted by the detected changes and notifies them to an Event Handler module 307.

The Event Handler 307 identifies one or more "owners" through a database 309 which contains the association between the Common files and their owners and sends the list of owners to the e-mail system 311.

The e-mail system 311 automatically starts a notification process that sends an e-mail to the owners of the associated file to manage the change.

If the change is accepted by all the interested parties the change is automatically performed in all the files that contain a reference to that ID. If the change is rejected the process restarts. The system has previously saved the status of the Common files before the change was proposed, so that the system is able to roll back to the previous status in case the change is not approved.

Figure 4:
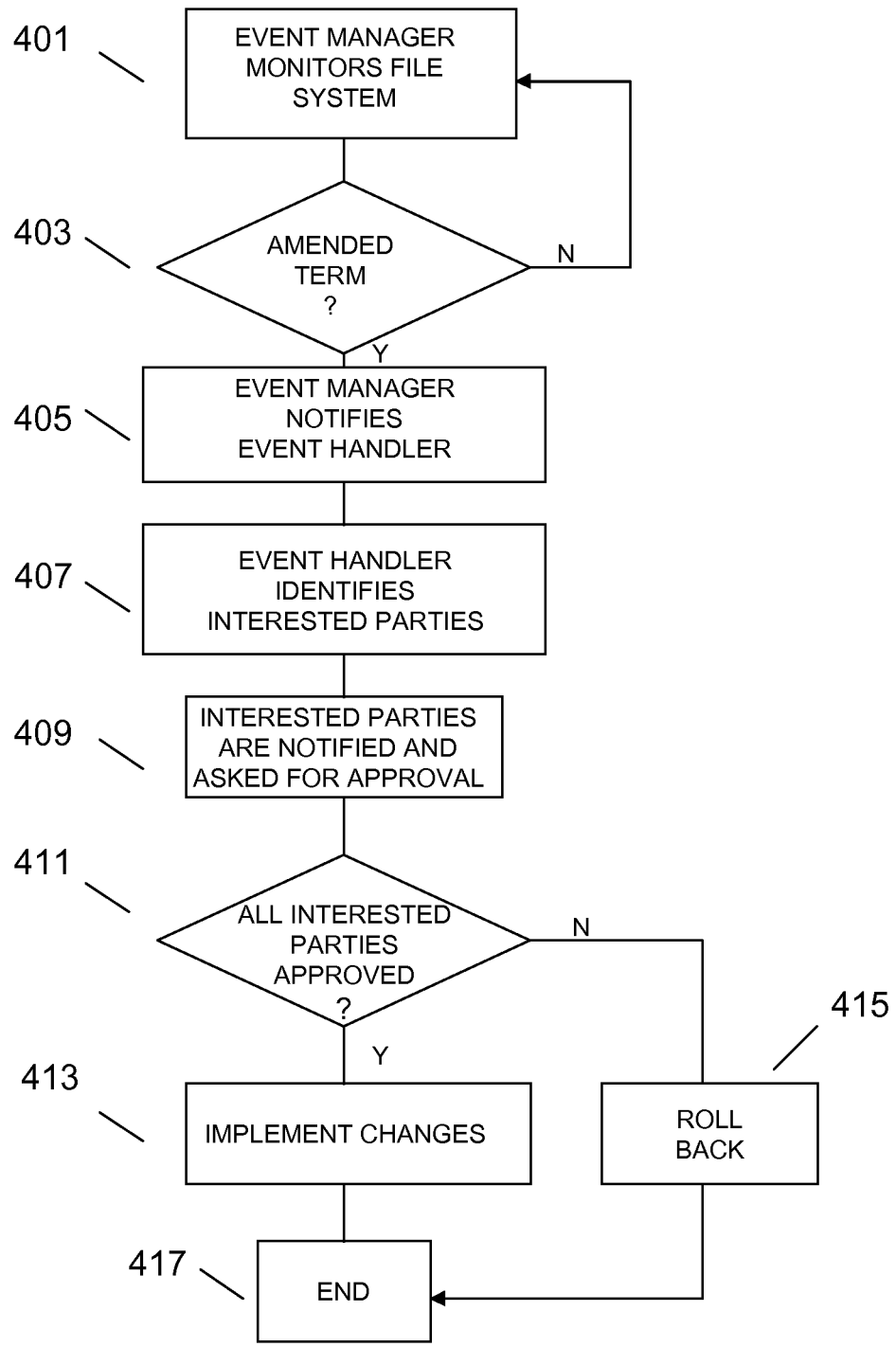
FIG. 4 shows a flowchart representing the steps to perform the method of a preferred embodiment of the present invention.

FIG. 4 schematically shows the method steps according to a preferred embodiment of the present invention. At step 401 the Event Manager module (see 305 in FIG. 3) monitors the file system (see 105 and 107 in FIGS. 1 and 3) to detect any possible change made to a plurality of predetermined terms, either in the source code files or in the documentation files. The predetermined terms are those included in a list which, according to a preferred embodiment of the present invention is contained in the two Common files 301 and 303 mentioned above with reference to FIG. 3. Then, when a change has been detected (step 403), the Event Handler module 307 (see FIG. 3) is notified (step 405). Even if in this figure it is not shown, the Event Manager, also store the previous status of the files, in case the proposed change will not finally receive all necessary approvals. The Event Handler checks on the database 309 who is the owner or responsible for such amended file (step 407) and instructs the e-mail system in order to communicate the requested change to the authorized owners or approvers and to obtain the approval by all interested parties (step 409). If and when all approvals are received (step 411), the change can be implemented and the process can terminate (or better can start again) as shown in steps 413 and 417. If not, according to a preferred embodiment of the present invention, the status of the file is rolled back to the previously saved status (step 415). If someone of the interested parties does not reply within a predetermined period of time, the system can interpret the missing answer as an implicit approval or as an implicit refusal of the proposed change. This last choice can depend upon user preference settings.

As an alternative embodiment, a user might be guided by the system directly to the Common files where the term which should be changed is defined. As an example, it is here described a possible implementing Scenario according to this alternative embodiment of the present invention:

1. A User A (e.g. a SW Developer) wants to replace Execute with Run in the documentation.
2. User A opens a documentation file, and sees that the term is defined in the Common file using a unique ID, therefore User A double-clicks on the term to modify it in the Common file. The Common file is stored on the repository and is read-only, so it cannot be modified without the owner's approval.
3. To edit it, User A must download the Common file (provided the right authorization levels are fulfilled) to have exclusive access to it. It is automatically locked on the repository so that it cannot be edited by others.
4. User A changes the term and checks the Common file in the repository.

6. The Event Manager detects the changed terms and sends them to the Event Handler.
7. The Event Handler performs the following activities:
   a. Collects information on the owners of the files impacted by the changes;
   b. Prepares and sends the distribution list to the e-mail system.
8. The e-mail system enriches the e-mail with all the necessary information and sends it to the distribution list.
9. All the recipients analyze the proposed changes and accept or reject the changes.
10. When all the recipients have accepted, or a maximum time (say 5 days) has elapsed, the Event manager automatically updates all the files (regardless whether they are owned by the Development Team or Documentation Development Team) that refer to the modified ID.

The above described scenario is only one possible implementation of the method according to the present invention. Many modifications are possible, e.g. it could be agreed that the lack of response by the recipients for a predetermined period of time is interpreted by the system as a refusal (while in the example above it is considered an approval). Also the interactions between the User A and the files (or Common files) could be different.

Those skilled in the art will easily appreciate that a number of alternatives are possible to implement the method described above without departing from the scope of the invention. Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the computers have different structure or include equivalent units; in any case, it is possible to replace the computers with any code execution entity (such as a PDA, a mobile phone, and the like).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be preloaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material), or with a combination of software and hardware.

The invention claimed is:

1. A method for managing software code file and related documentation file changes comprising:
   reading in memory of a computer a repository of a list of key terms occurring in multiple different software code files and correspondingly different related documentation files, each of the software code and related documentation files being associated with a file owner;
   detecting, by a processor of the computer, a change occurring to one of the key terms on the list of key terms in one of the software code and related documentation files;
   identifying all term occurrences, across all of the software code and related documentation files, of the one of the key terms for which the change has been detected;
   identifying a file owner associated with each of the software code and related documentation files in which one of the term occurrences has been found;
   prompting each identified file owner to approve or reject the change on the identified occurrences;
   responsive to receiving approval by each identified file owner, implementing the detected change to all identified term occurrences across all of the software code and related documentation files in which one of the term occurrences has been found;
   responsive to detecting the change occurring to one of the key terms on the list of key terms in one of the software code and related documentation files, saving, by the processor of the computer, a status of one of the software code and related documentation files before the detected change; and,
   responsive to receiving rejection by an identified file owner, recovering a corresponding one of the software code and related documentation files to a saved status.

2. The method of claim 1, wherein receiving rejection by the identified file owner further comprises a lack of approval by the identified file owner within a predetermined period of time.

3. The method of claim 1, wherein receiving approval by each identified file owner further comprises a lack of approval by a file owner within a predetermined period of time being considered equivalent to the change having been approved.

4. The method of claim 1, wherein the repository stores two separate lists of terms including a first list containing terms found in the software code files and a second list containing terms found in the documentation files.

5. The method of claim 1, wherein each identified file owner is prompted to approve or reject the change on the identified occurrences by means of an e-mail server.

6. A computer system adapted to manage software code file and related documentation file changes, comprising:
   a computer with at least one processor and memory; and,
   an event manager module comprising computer program code executing in the memory of the computer and performing the steps of:
   reading in memory of a computer a repository of a list of key terms occurring in multiple different software code files and correspondingly different related documentation files, each of the software code and related documentation files being associated with at file owner;
   detecting, by the at least one processor of the computer, a change occurring to one of the key terms on the list of key terms in one of the software code and related documentation files;

identifying across all of the software code and related documentation files, all term occurrences of the one of the key terms for which the change has been detected;

identifying a file owner associated with each of the software code and related documentation files in which one of the term occurrences has been found;

prompting each identified file owner to approve or reject the change on the identified occurrences;

responsive to receiving approval by each identified file owner, implementing the detected change to all identified term occurrences across all of the software code and related documentation files in which one of the term occurrences has been found;

responsive to detecting the change occurring to one of the key terms on the list of key terms in one of the software code and related documentation files, saving, by the at least one processor of the computer, a status of one of the software code and related documentation files before the detected change; and, responsive to receiving rejection by an identified file owner, recovering a corresponding one of the software code and related documentation files to a saved status.

7. The system of claim 6, wherein the computer program code of the event manager module for receiving rejection by the identified file owner further comprises computer program code wherein a lack of approval by the identified file owner within a predetermined period of time is considered as equivalent to the change having been rejected.

8. The system of claim 6, wherein the computer program code of the event manager module for receiving approval by each identified file owner further comprises computer program code wherein a lack of approval by a file owner within a predetermined period of time is considered as equivalent to the change having been approved.

9. The system of claim 6, wherein the repository stores two separate lists of terms including a first list containing terms found in the software code files and a second list containing terms found in the documentation files.

10. The system of claim 6, further comprises an e-mail system, the e-mail system comprising computer program code for prompting each identified file owner to approve or reject the change on the identified occurrences.

11. A computer program product for managing software code file and related documentation file changes, the computer program product comprising:

a non-transitory computer readable storage medium having computer readable program code embodied therewith, the computer readable program code comprising:

computer readable program code for reading a repository of a list of key terms occurring in multiple different software code files and correspondingly different related documentation files, each of the software code and related documentation files being associated with at file owner;

computer readable program code for detecting a change occurring to one of the key terms on the list of key terms in one of the software code and related documentation files;

computer readable program code for identifying across all of the software code and related documentation files, all term occurrences of the one of the key terms for which the change has been detected;

identifying a file owner associated with each of the software code and related documentation files in which one of the term occurrences has been found;

computer readable program code for prompting each identified file owner to approve or reject the change on the identified occurrences;

computer readable program code for responding to receipt of approval by each identified file owner, by implementing the detected change to all identified term occurrences across all of the software code and related documentation files in which one of the term occurrences has been found;

computer readable program code for responding to detecting the change occurring to one of the key terms on the list of key terms in one of the software code and related documentation files, by saving a status of one of the software code and related documentation files before the detected change, and, computer readable program code for responding to receiving rejection by an identified file owner, by recovering a corresponding one of the software code and related documentation files to a saved status.

12. The computer program product of claim 11, wherein computer readable program code for receiving rejection by the identified file owner further comprises a lack of approval by identified file owner within a predetermined period of time.

13. The computer program product of claim 11, wherein computer readable program code for receiving approval by each identified file owner further comprises a lack of approval by a file owner within a predetermined period of time being considered equivalent to the change having been approved.

* * * * *